United States Patent
Ku et al.

(10) Patent No.: US 8,532,312 B2
(45) Date of Patent: Sep. 10, 2013

(54) MOBILE DEVICE HAVING ACOUSTIC SHOCK PREVENTION CIRCUIT AND RELATED OPERATION METHOD

(75) Inventors: Hyo Sun Ku, Gyeonggi-do (KR); Ji Hwa Kim, Gyeonggi-do (KR); Jin Sung Park, Gyeonggi-do (KR); Hyo Jung Lee, Daegu (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 316 days.

(21) Appl. No.: 12/858,526

(22) Filed: Aug. 18, 2010

(65) Prior Publication Data

US 2011/0045874 A1 Feb. 24, 2011

(30) Foreign Application Priority Data

Aug. 21, 2009 (KR) .................... 10-2009-0077724
Nov. 4, 2009 (KR) .................... 10-2009-0105953

(51) Int. Cl.
*H04B 15/00* (2006.01)

(52) U.S. Cl.
USPC ................. 381/94.5; 381/55; 455/569.1

(58) Field of Classification Search
USPC ........ 381/55, 94.5, 94.8, 104–109; 455/569.1
See application file for complete search history.

(56) References Cited

U.S. PATENT DOCUMENTS

| | | | |
|---|---|---|---|
| 7,200,238 B1* | 4/2007 | Shyu et al. | 381/94.8 |
| 7,200,258 B2* | 4/2007 | Lee et al. | 382/145 |
| 2006/0093161 A1* | 5/2006 | Falcon | 381/104 |
| 2007/0258614 A1* | 11/2007 | Langberg | 381/379 |
| 2011/0136546 A1* | 6/2011 | Otsuki | 455/566 |

* cited by examiner

*Primary Examiner* — Disler Paul
(74) *Attorney, Agent, or Firm* — Cha & Reiter, LLC

(57) ABSTRACT

A mobile device has an acoustic shock prevention circuit and prevents an acoustic shock unexpectedly occurring when receiver signals and speaker signals are output through a receiver-integrated speaker. The acoustic shock prevention circuit is preferably disposed between the receiver-integrated speaker and an audio processing unit is enabled in a receiver mode and disabled in a speaker mode. When the audio processing unit outputs audio signals partly exceeding a given output range, the enabled acoustic shock prevention circuit removes the exceeded parts of the audio signals.

17 Claims, 8 Drawing Sheets

MOBILE DEVICE HAVING ACOUSTIC SHOCK PREVENTION CIRCUIT AND RELATED OPERATION METHOD

CLAIM OF PRIORITY

This application claims the benefit of priority under 35 U.S.C. §119 from Korean Patent Application No. 10-2009-0077724 filed Aug. 21, 2009 and Korean Patent Application No. 10-2009-0105953 filed Nov. 4, 2009, the contents of both applications are incorporated by reference in their entirety.

BACKGROUND OF THE INVENTION

1. Field of the Invention

The present invention relates in general to a mobile device having an acoustic shock prevention circuit. More particularly, the present invention relates to a method and apparatus for preventing an acoustic shock in a mobile device.

2. Description of the Related Art

With a rapid growth in mobile communication technology, mobile devices now provide a variety of functions that typically include a video call, a scheduler, a digital multimedia broadcasting (DMB), a wireless Internet, and the like in addition to traditional functions such as a voice call and a text message transmission. In order to favorably offer such functions, mobile devices now include various components such as a camera module, an antenna, a light sensor, a proximity sensor, a broadcast antenna, a wireless LAN module, and the like. Also, mobile devices have in general both a receiver for outputting voices during a call, and a speaker for outputting ring tones, music sounds, etc.

Moreover, to meet market demands for improving design, portability, power usage, cost, etc., mobile devices have become much smaller, thinner, and lighter with each new generation of mobile devices. Such a device does not have enough space for a receiver and a speaker separately equipped, so an improved speaker having a receiver function (hereinafter, referred to as a receiver-integrated speaker) has been developed and is increasing in use.

A receiver-integrated speaker is positioned such as to be very close to a user's ear during a normal voice call. Therefore, a conventional mobile device restricts, based on software, the output level of a receiver-integrated speaker while a voice call is being performed. However, such a mobile device may have a possibility that an acoustic shock will occur unexpectedly due to some trouble in a communication network, unusual operation in audio gain, etc. When this acoustic shock occurs, most users may experience discomfort and pain due to a sudden loud sound, and some users may suffer a hearing deficiency. Accordingly, there is a need in the art for a new way of preventing an unexpected acoustic shock during a voice call in a mobile device having a receiver-integrated speaker.

SUMMARY OF THE INVENTION

Accordingly, the present invention provides a mobile device having a solution to prevent an acoustic shock unexpectedly occurring during a voice call.

According to one exemplary aspect of the present invention, there is provided a mobile device having a receiver-integrated speaker, the mobile device preferably including: an audio processing unit configured to decode audio signals; a control unit configured to determine an output mode of the audio processing unit; and an acoustic shock prevention circuit disposed preferably between the receiver-integrated speaker and the audio processing unit, being enabled when the output mode is a receiver mode, and being disabled when the output mode is a speaker mode, wherein when the audio processing unit outputs the audio signals partly exceeding a given output range, the enabled acoustic shock prevention circuit removes the exceeded parts of the audio signals.

According to another exemplary aspect of the present invention, provided is a method for preventing an acoustic shock in a mobile device having a receiver-integrated speaker, the method comprising: determining a type of output mode of an audio processing unit if there is a request for outputting audio signals; and controlling whether or not to enable an acoustic shock prevention circuit according to the type of output mode, wherein the acoustic shock prevention circuit is disposed between the receiver-integrated speaker and the audio processing unit, and wherein if the audio processing unit outputs the audio signals partly exceeding a given output range, the enabled acoustic shock prevention circuit removes the exceeded parts of the audio signals.

Other exemplary aspects, advantages, and salient features of the invention will become more apparent to those skilled in the art from the following detailed description, which, taken in conjunction with the annexed drawings, discloses exemplary embodiments of the invention.

DETAILED DESCRIPTION

Exemplary, non-limiting embodiments of the present invention will now be described more fully with reference to the accompanying drawings. However, the present invention may be embodied in many different forms and should not be construed as limited to the exemplary embodiments set forth herein. Rather, the disclosed exemplary embodiments are provided so that this disclosure will be thorough and complete, and will fully convey the scope of the invention to those skilled in the art. The principles and features of the present invention may be employed in varied and numerous exemplary embodiments without departing from the spirit of the invention and the scope of the appended claims.

Furthermore, well-known or widely used techniques, elements, structures, and processes may not be described or illustrated in detail to avoid obscuring appreciation of the present invention by a person of ordinary skill in the art. The drawings represent exemplary embodiments of the invention, the drawings are not necessarily drawn to scale and certain features may be exaggerated or omitted in order to better illustrate and explain the present invention.

Among terms set forth herein, a receiver mode refers to a normal voice call mode in which a user holds a receiver directly adjacent or substantially in contact with his or her ear to perform a call.

In addition, a speaker mode refers to a speakerphone mode, a video call mode, a music file play mode, and the like in which a user does not position a receiver to his or her ear.

Figure 1:
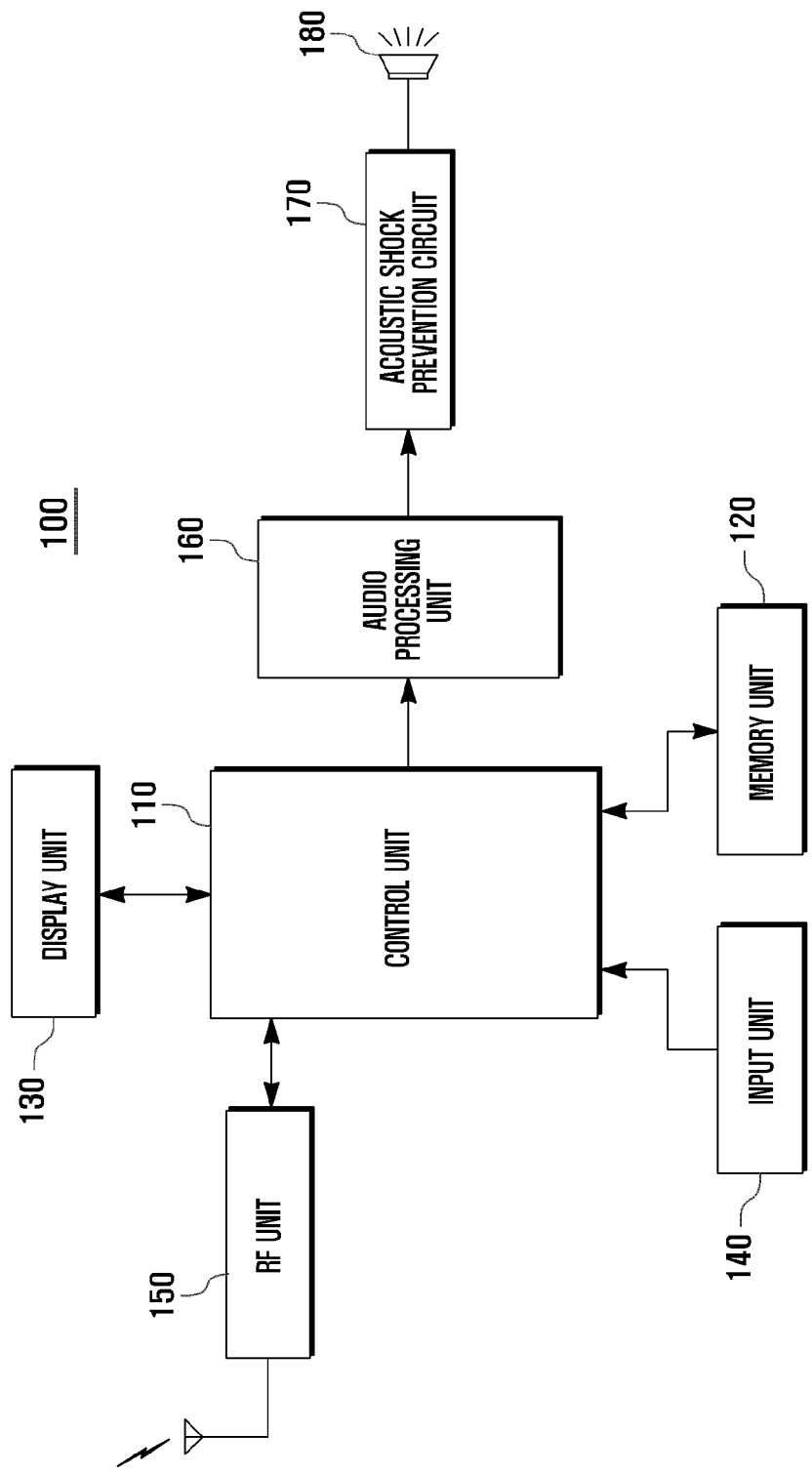
FIG. 1 is a block diagram illustrating a mobile device in accordance with an exemplary embodiment of the present invention.

FIG. 1 is a block diagram illustrating a mobile device in accordance with an exemplary embodiment of the present invention.

Referring now to FIG. 1, the mobile device 100 according to an exemplary embodiment of the present invention preferably includes a control unit 110, a memory unit 120, a display unit 130, an input unit 140, a radio frequency (RF) unit 150, an audio processing unit 160, an acoustic shock prevention circuit 170, and a receiver-integrated speaker 180.

With further regard to the mobile device 100 having the above-mentioned elements the acoustic shock prevention circuit 170 which is disposed on a path of audio signal transmission between the audio processing unit 160 and the receiver-integrated speaker 180, is enabled in a receiver mode so as to restrict the output level of audio signals, and hence prevents an acoustic shock from unexpectedly occurring due to some problem in a communication network, unusual operation in audio gain, etc. Now, each individual element will be described in detail.

The input unit 140 preferably includes a plurality of normal input keys and special function keys that are configured to receive user's instructions. For example, the input unit 140 may include a dialing key for making a call, a video call key, an end call key, a volume key for adjusting the output volume of audio signals, a speakerphone mode key for entering a speaker mode, and the like. Normally, the input unit 140 may be formed of one or a combination of a touch pad, a touch screen, a normal keypad, a Qwerty keypad, a Dvorak keypad, and any other suitable function keys.

The display unit 130 represents a variety of information on a screen in association with the operation of the mobile device 100 and a user's input. For example, the display unit 130 may output a predefined idle or main page, a variety of menu pages, a video image in a video call, and the like. Normally the display unit 130 may be formed of a liquid crystal display (LCD), an organic light emitting device (OLED), any type of thing film technology screen or any other equivalents. In some exemplary embodiments, the display unit 130 may be formed of a touch screen which also serves as the input unit 140.

The RF unit 150 transmits and receives, under the control of the control unit 110, voice signals in connection with a call function, and data required for a data communication. Normally the RF unit 150 may include a duplexer, an RF transmitter, and an RF receiver. The RF transmitter upwardly converts the frequency of outgoing signals received from the control unit 110 and then amplifies them. The RF receiver amplifies incoming signals with low-noise and downwardly converts their frequency. The duplexer isolates the RF receiver from the RF transmitter.

The memory unit 120 stores a variety of applications required for an operating system or for optional functions, such as a sound output, an image or video play, a broadcast reception, of the mobile device 100 and related user data. In particular, the memory unit 120 may store an application for enabling the acoustic shock prevention circuit 170 in a receiver mode and for disabling the acoustic shock prevention circuit 170 in a speaker mode or an idle state under the control of the control unit 110.

The audio processing unit 160 transmits audio signals to the receiver-integrated speaker 180 and/or delivers audio signals inputted from a microphone to the control unit 110. Namely, the audio processing unit 160 converts analog voice signals inputted from the microphone into digital voice signals and then sends them to the control unit 110, or converts digital voice signals into analog voice signals and then outputs them through the receiver-integrated speaker 180. For the above process, the audio processing unit 160 may include a vocoder. Additionally, the audio processing unit 160 may also output key input sounds stored in the memory unit 120, sound effects by function execution, music file play sounds, and so forth. For the present, the audio processing may include a codec.

In particular, the audio processing unit 160 may change a path of audio signals according to an output mode, namely, a receiver mode or a speaker mode. In connection with a mode shift, the audio processing unit 160 may include, for example, receiver output terminals to be enabled in a receiver mode and speaker output terminals to be enabled in a speaker mode. Namely, the audio processing unit 160 outputs audio signals (hereinafter referred to as receiver signals) through the receiver output terminals in a receiver mode, and outputs audio signals (hereinafter referred to as speaker signals) through the speaker output terminals in a speaker mode. Here, the maximum output level of receiver signals may be set to a relatively low power (e.g., 50 mW) so that a user may not feel uncomfortable. On the contrary, the maximum output level of speaker signals may be set to a relatively high power (e.g., 800 mW). These values are only exemplary, and do not in any way serve as a limitation for the appended claims. The acoustic shock prevention circuit 170 is located between the audio processing unit 160 and the receiver-integrated speaker 180, while passing only signals within a given output range. Particularly, the acoustic shock prevention circuit 170 is enabled in a receiver mode and disabled in a speaker mode under the control of the control unit 110. When enabled in a receiver mode, the acoustic shock prevention circuit 170 restricts the output level of audio signals delivered to the receiver-integrated speaker 180 so as not to be too loud and cause discomfort to a user holding the mobile device up again their ear. Some examples of the acoustic shock prevention circuit 170 will be described later with reference to FIGS. 2A to 2D.

The receiver-integrated speaker 180 is a device used for outputting audio signals. Namely, the receiver-integrated speaker 180 can output audio signals (especially including receiver signals and speaker signals) received from the audio processing unit 160. For instance, the receiver-integrated speaker 180 may output, for example, predetermined ring tones under the control of the control unit 110 when an incoming call arrives. Also, the receiver-integrated speaker 180 may output a voice received from a call counterpart during a voice call. Since such receiver-integrated speaker 180 will be understood by those skilled in the art, a further detailed description may be omitted.

The control unit 110, which may comprise a microprocessor, controls the whole operation of the mobile device 100 and the flow of signals between internal function blocks. Particularly, the control unit 110 determines whether or not to enable the acoustic shock prevention circuit 170, depending on an output mode of the audio processing unit 160. As mentioned above, an output mode may include a receiver mode in which the acoustic shock prevention circuit 170 is enabled, and a speaker mode in which the acoustic shock prevention circuit 170 is disabled. The control unit 110 enters a receiver mode by enabling the acoustic shock prevention circuit 170 when sending or receiving a voice call request, and enters a speaker mode by disabling the acoustic shock prevention circuit 170 when sending or receiving a video call request.

Additionally, the control unit 110 determines whether or not a call mode is changed during a voice call, and then controls the acoustic shock prevention circuit 170. For instance, if a speakerphone function is activated while a call is performed in a receiver mode, the control unit 110 disables the acoustic shock prevention circuit 170. Meanwhile, if a speakerphone function is inactivated during a speakerphone call, namely, if a call mode returns to a receiver mode, the control unit 110 enables the acoustic shock prevention circuit 170. In addition, if any call is terminated, the control unit 110 keeps the acoustic shock prevention circuit 170 in a default state, namely, in a disabled state.

Although not illustrated, the mobile device 100 may further include any optional elements such as, for example, a camera module, a short distance communication module, a broadcast receiving module, a digital sound play module, an Internet access module, and the like. The above elements are exemplary only and not to be considered as a limitation of the presently claimed invention. Any other equivalents may be essentially or selectively included in the mobile device 100 of the present invention.

Hereinbefore, the configuration and operation of the mobile device 100 according to exemplary embodiment of the present invention have been described. Now, several examples of the aforesaid acoustic shock prevention circuit 170 will now be described in detail.

Figure 2A:
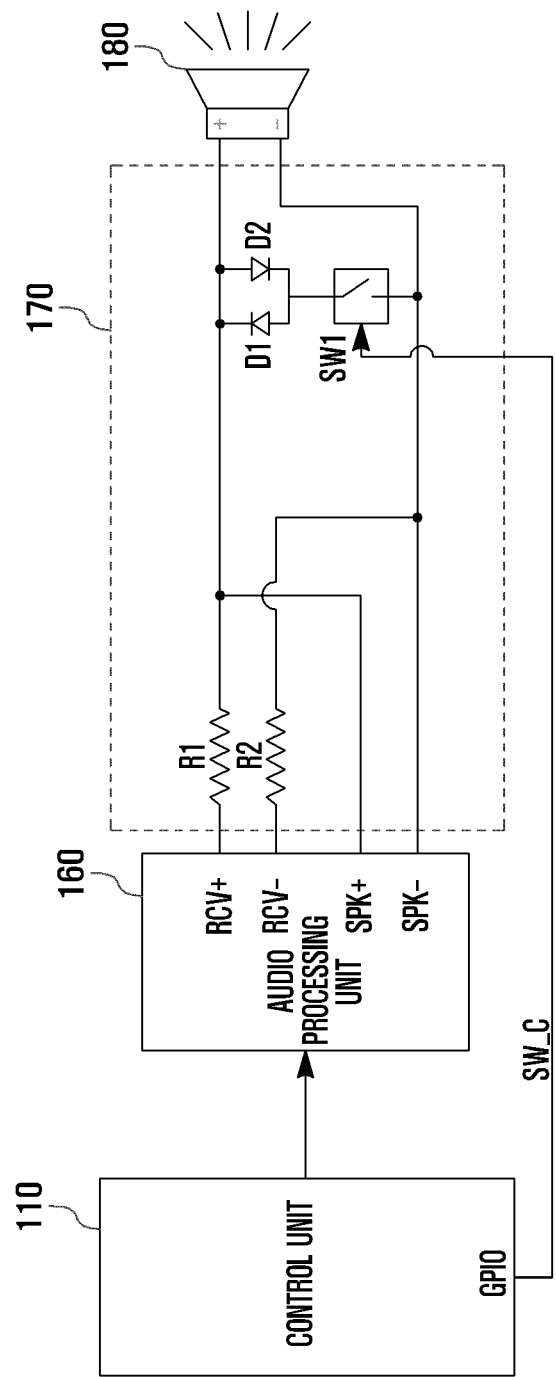
FIG. 2A is a view illustrating an acoustic shock prevention circuit in accordance with a first exemplary embodiment of the present invention.

FIG. 2A is a view illustrating an acoustic shock prevention circuit in accordance with the first exemplary embodiment of the present invention.

Referring now to FIG. 2A, the acoustic shock prevention circuit 170 according to the first exemplary embodiment of the present invention includes the first resistor R1, the second resistor R2, the first diode D1, the second diode D2, and the first switch SW1.

Each of the first diode D1 and the second diode D2 allows an electric current to flow in only one given direction when a voltage is applied greater than a forward voltage (Vf). The first switch SW1 is turned on or off to connect or disconnect a path, depending on a control signal (SW_C) of the control unit 110. The first resistor R1 and the second resistor R2 are offered for impedance matching between speaker terminals (+, −) of the receiver-integrated speaker 180 and receiver output terminals (RCV+, RCV−) of the audio processing unit 160. If impedance matching is unnecessary, such resistors may be not used.

The following describes the connection relationship between elements in the acoustic shock prevention circuit 170. One end of the first resistor R1 is connected to a positive receiver output terminal (RCV+) of the audio processing unit 160, and the other end of the first resistor R1 is connected to all of a positive speaker output terminal (SPK+) of the audio processing unit 160 and one end of the first and second diodes D1 and D2 (e.g., a cathode of the first diode D1 and an anode of the second diode D2), and a positive speaker terminal (+) of the receiver-integrated speaker 180. Here, the other ends of the first and second diodes D1 and D2 (e.g., an anode of the first diode D1 and a cathode of the second diode D2) are connected to one end of the first switch SW1. Additionally, one end of the second resistor R2 is connected to a negative receiver output terminal (RCV−) of the audio processing unit 160, and the other end of the second resistor R2 is connected to all of a negative speaker output terminal (SPK−) of the audio processing unit 160, the other end of the first switch SW1, and a negative speaker terminal (−) of the receiver-integrated speaker 180. A control terminal of the first switch SW1 is connected to the control unit 110.

In a receiver mode, the control unit 110 controls the audio processing unit 160 so that audio signals may be output through the receiver output terminals (RCV+, RCV−) of the audio processing unit 160, and then turns on the first switch SW1. For this action, the control unit 110 transmits an enabling signal to the control terminal of the first switch SW1. When the first switch SW1 is turned on, the first and second diodes D1 and D2 are connected in parallel between the positive and negative speaker terminals (+, −) of the receiver-integrated speaker 180. In this case, the acoustic shock prevention circuit 170 can restrict the output level of audio signals output from the receiver output terminals (RCV+, RCV−). A related description will be made later with reference to FIGS. 3A and 3B.

In a speaker mode, the control unit 110 controls the audio processing unit 160 so that audio signals may be output through the speaker output terminals (SPK+, SPK−) of the audio processing unit 160, and then turns the first switch SW1 off. For this to occur, the control unit 110 transmits a disabling signal to the control terminal of the first switch SW1. When the first switch SW1 is turned off, the first and second diodes D1 and D2 are disconnected between the positive and negative speaker terminals (+, −) of the receiver-integrated speaker 180. In this case, the acoustic shock prevention circuit 170 does not restrict the output level of audio signals output from the speaker output terminals (SPK+, SPK−) of the audio processing unit 160.

As discussed heretofore, the acoustic shock prevention circuit 170 can restrict the output level of audio signals in a receiver mode. Therefore, the present invention can prevent an unexpected acoustic shock caused by unusual operation in audio gain, etc. in a receiver mode.

Figure 2B:
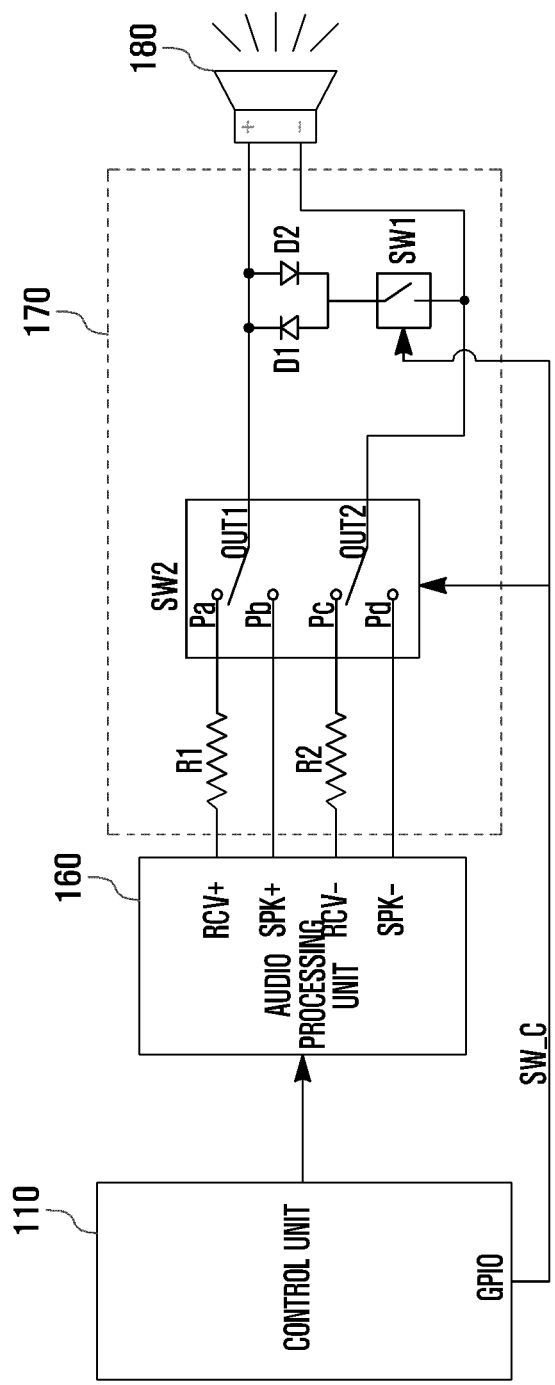
FIG. 2B is a view illustrating an acoustic shock prevention circuit in accordance with a second exemplary embodiment of the present invention.

FIG. 2B is a view illustrating an acoustic shock prevention circuit in accordance with the second exemplary embodiment of the present invention.

Referring now to FIG. 2B, the acoustic shock prevention circuit 170 in the second exemplary embodiment has a similar configuration as in the first exemplary embodiment, and further includes a second switch SW2 performs a switching between the positive receiver output terminal (RCV+) and the positive speaker output terminal (SPK+) of the audio processing unit 160 and between the negative receiver output terminal (RCV−) and the negative speaker output terminal (SPK−) of the audio processing unit 160, depending on a control signal (SW_C). All elements except the second switch SW2 are similar as those in the first exemplary embodiment, so repeated descriptions will be avoided herein.

As mentioned above, the second switch SW2 can perform a switching between the receiver output terminals (RCV+, RCV−) and the speaker output terminals (SPK+, SPK−) of the audio processing unit 160, depending on a control signal (SW_C). Namely, the second switch SW2 can select one of a speaker signal and a receiver signal under the control of the control unit 110. To execute the above function, the second switch SW2 has four input terminals (Pa, Pb, Pc, Pd), two output terminals (OUT1, OUT2), and a control terminal. More specifically, the second switch SW2 has the first input terminal (Pa) connected to the positive receiver output terminal (RCV+) of the audio processing unit 160, the second input terminal (Pc) connected to the negative receiver output terminal (RCV−) of the audio processing unit 160, the third input terminal (Pb) connected to the positive speaker output terminal (SPK+) of the audio processing unit 160, the fourth input terminal (Pd) connected to the negative speaker output terminal (SPK−) of the audio processing unit 160, the first output terminal (OUT1) selectively connected to one of the first input terminal (Pa) and the third input terminal (Pb), the second output terminal (OUT2) selectively connected to one of the second input terminal (Pc) and the fourth input terminal (Pd), and the control terminal connected to the control unit 110.

In a receiver mode, the control unit 110 controls the audio processing unit 160 so that audio signals may be output through the receiver output terminals (RCV+, RCV−) of the audio processing unit 160. Additionally, the control unit 110 controls the second switch SW2 so that the first input terminal (Pa) may be connected to the first output terminal (OUT1) and also the second input terminal (Pc) may be connected to the second output terminal (OUT2). Furthermore, the control unit 110 turns the first switch SW1 on. When the first switch SW1 is turned on, the output level of audio signals (i.e., receiver signals) outputted from the audio processing unit 160 is restricted by the first and second diodes D1 and D2, as previously discussed in the first exemplary embodiment.

On the contrary, in a speaker mode, the control unit 110 controls the audio processing unit 160 so that audio signals may be output through the speaker output terminals (SPK+, SPK−) of the audio processing unit 160. Additionally, the control unit 110 controls the second switch SW2 so that the third input terminal (Pb) may be connected to the first output terminal (OUT1) and also the fourth input terminal (Pd) may be connected to the second output terminal (OUT2), and turns the first switch SW1 off. When the first switch SW1 is turned off, the output level of audio signals (i.e., speaker signals) outputted from the audio processing unit 160 is not restricted, as earlier discussed in the first exemplary embodiment.

Meanwhile, although FIG. 2B shows that a single control signal (SW_C) is applied to the second switch SW2 as well as the first switch SW1, this is exemplary only and not to be considered as a limitation of the present invention. Alternatively, the second switch SW2 may be controlled through other control signal.

Figure 2C:
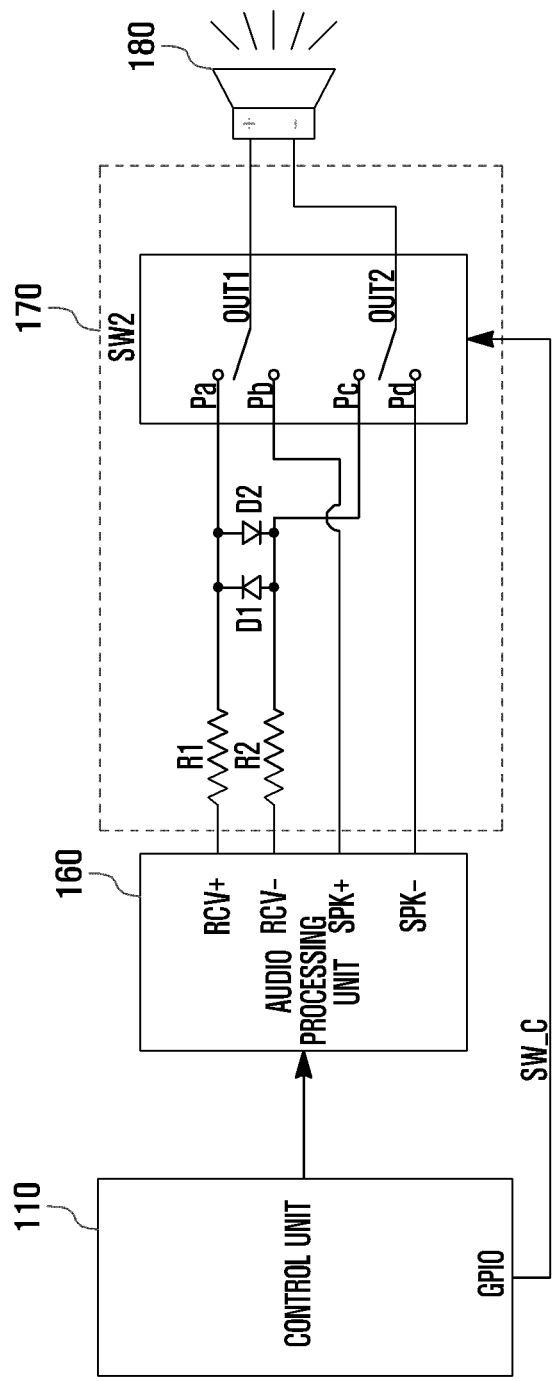
FIG. 2C is a view illustrating an acoustic shock prevention circuit in accordance with a third exemplary embodiment of the present invention.

FIG. 2C is a view illustrating an acoustic shock prevention circuit in accordance with the third exemplary embodiment of the present invention.

Referring now to FIG. 2C, the acoustic shock prevention circuit 170 in the third exemplary embodiment includes the first diode D1 and the second diode D2 which are respectively connected in parallel to both receiver output terminals (RCV+, RCV−) of the audio processing unit 160. And the acoustic shock prevention circuit 170 in the present embodiment further includes the second switch SW2 which performs a switching between the receiver output terminals (RCV+, RCV−) and the speaker output terminals (SPK+, SPK−) of the audio processing unit 160, depending on a control signal (SW_C).

In a receiver mode, the control unit 110 controls the audio processing unit 160 so that audio signals may be output through the receiver output terminals (RCV+, RCV−) of the audio processing unit 160. Additionally, the control unit 110 controls the second switch SW2 so that the first input terminal (Pa) may be connected to the first output terminal (OUT1) and also the second input terminal (Pc) may be connected to the second output terminal (OUT2). Specifically, in a receiver mode, positive audio signals are output through the first path which is formed of the positive receiver output terminal (RCV+) of the audio processing unit 160, the first resistor R1 connected in series thereto, the first and second diodes D1 and D2 connected in parallel thereto, the first input terminal (Pa) of the second switch SW2, the first output terminal (OUT1) of the second switch SW2, and the positive speaker terminal (+) of the receiver-integrated speaker 180. Also, negative audio signals are output through the second path which is formed of the negative receiver output terminal (RCV−) of the audio processing unit 160, the second resistor R2 connected in series thereto, the first and second diodes D1 and D2 connected in parallel thereto, the second input terminal (Pc) of the second switch SW2, the second output terminal (OUT2) of the second switch SW2, and the negative speaker terminal (−) of the receiver-integrated speaker 180.

Meanwhile, in a speaker mode, the control unit 110 controls the audio processing unit 160 so that audio signals may be outputt through the speaker output terminals (SPK+, SPK−) of the audio processing unit 160. Additionally, the control unit 110 controls the second switch SW2 so that the third input terminal (Pb) may be connected to the first output terminal (OUT1) and also the fourth input terminal (Pd) may be connected to the second output terminal (OUT2). Specifically, in a speaker mode, positive audio signals are outputt through the third path which is formed of the positive speaker output terminal (SPK+) of the audio processing unit 160, the third input terminal (Pb) of the second switch SW2, the first output terminal (OUT1) of the second switch SW2, and the positive speaker terminal (+) of the receiver-integrated speaker 180. Also, negative audio signals are outputt through the fourth path which is formed of the negative speaker output terminal (SPK−) of the audio processing unit 160, the fourth input terminal (Pd) of the second switch SW2, the second output terminal (OUT2) of the second switch SW2, and the negative speaker terminal (−) of the receiver-integrated speaker 180.

As discussed heretofore, the third exemplary embodiment of the present invention separates a receiver signal path and a speaker signal path by using the second switch SW2. So, in case of the present exemplary embodiment, there is no need to have the first switch SW1 required for the first and second embodiments.

The above-discussed acoustic shock prevention circuit 170 shown in FIGS. 2A to 2C may be applied to a case where the audio processing unit 160 supports a differential output type. Described hereinafter is the acoustic shock prevention circuit 170 applied to another case where the audio processing unit 160 supports a single output type.

Figure 2D:
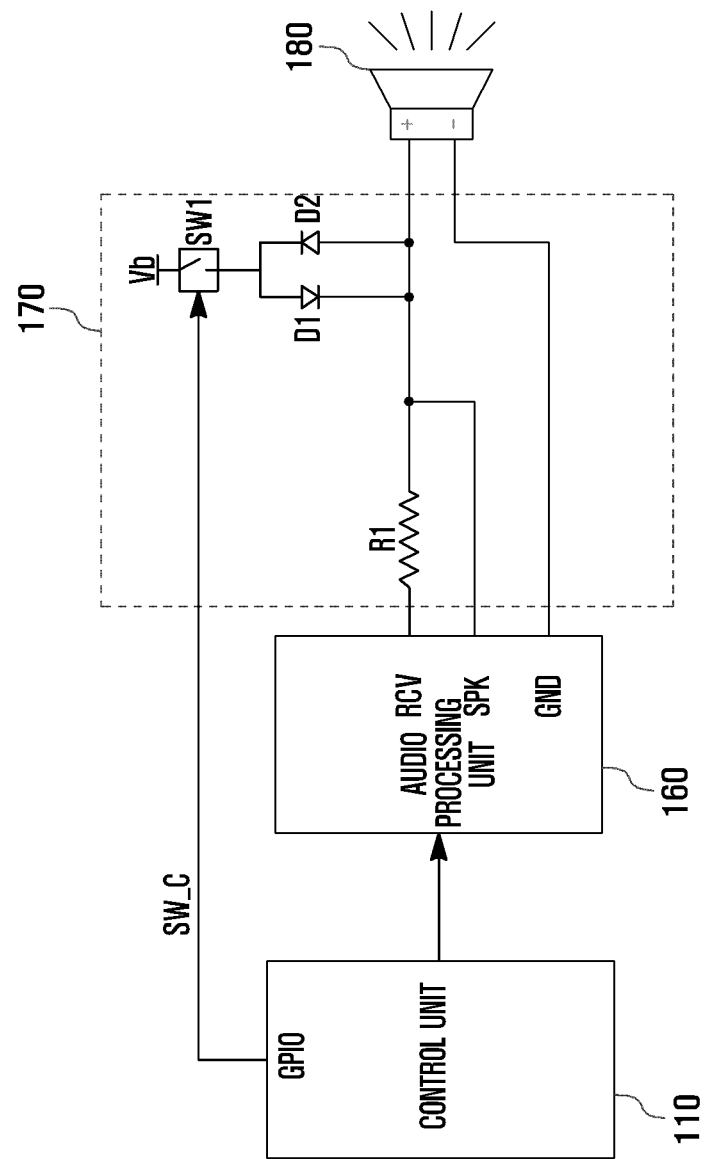
FIG. 2D is a view illustrating an acoustic shock prevention circuit in accordance with a fourth exemplary embodiment of the present invention.

FIG. 2D is a view illustrating an acoustic shock prevention circuit in accordance with the fourth exemplary embodiment of the present invention.

Referring now to FIG. 2D, the acoustic shock prevention circuit 170 according to the fourth exemplary embodiment of the present invention includes the first resistor R1, the first diode D1, the second diode D2, and the first switch SW1.

The following is the connection relationship between elements in the acoustic shock prevention circuit 170. One end of the first resistor R1 is connected to a receiver output terminal (RCV) of the audio processing unit 160, and the other end of the first resistor R1 is connected to all of a speaker output terminal (SPK) of the audio processing unit 160, one end of the first and second diodes D1 and D2 (e.g., a cathode of the first diode D1 and an anode of the second diode D2), and a positive speaker terminal (+) of the receiver-integrated speaker 180. Here, the other end of each of the first and second diodes D1 and D2 (e.g., an anode of the first diode D1 and a cathode of the second diode D2) are connected to one end of the first switch SW1, and a bias voltage (Vb) is applied to the other end of the first switch SW1. A control terminal of the first switch SW1 is connected to a GPIO terminal of the control unit 110.

In a receiver mode, the control unit 110 controls the audio processing unit 160 so that audio signals may be outputted through the receiver output terminal (RCV) of the audio processing unit 160, and then turns the first switch SW1 on. In this case, the output level of audio signals outputted from the receiver output terminal (RCV) is physically restricted by the first and second diodes D1 and D2.

Meanwhile, in a speaker mode, the control unit 110 controls the audio processing unit 160 so that audio signals may be output through the speaker output terminal (SPK) of the audio processing unit 160, and then turns the first switch SW1 off. In this case, since the first and second diodes D1 and D2 are in an open state from a circuit perspective, the output level of audio signals output from the speaker output terminal (SPK) is not restricted.

Figure 3A:
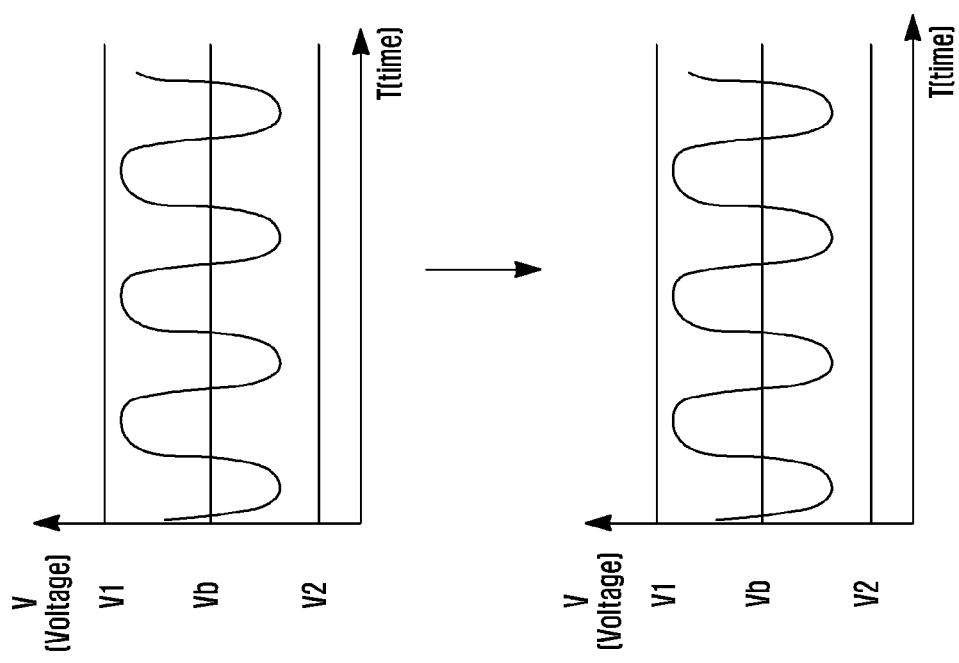
FIGS. 3A and 3B are graphs illustrating audio signal outputs in accordance with an exemplary embodiment of the present invention.
Figure 3B:
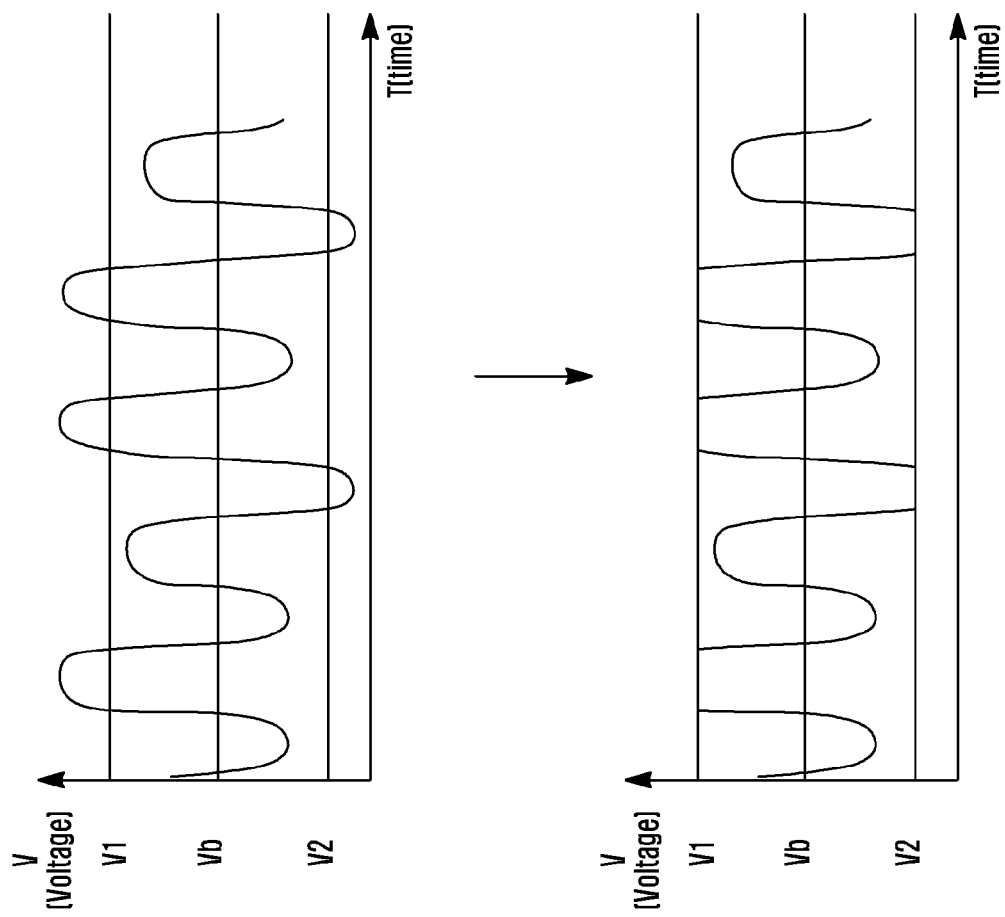

FIGS. 3A and 3B are graphs illustrating audio signal outputs in accordance with an exemplary embodiment of the present invention.

Referring now to FIGS. 1 to 3B, the acoustic shock prevention circuit 170 allows the output of audio signals just within a given output range. Specifically, if the audio processing unit 160 outputs audio signals varying within a given output range, namely, between the first reference voltage (V1) and the second reference voltage (V2), as shown in FIG. 3A, the acoustic shock prevention circuit 170 transmits original audio signals to the receiver-integrated speaker 180 without any variations in original sounds. On the contrary, if the audio processing unit 160 outputs audio signals partly exceeds a given output range as shown in FIG. 3B, the acoustic shock prevention circuit 170 removes (i.e. clips) exceeded parts of audio signals and then transmits only remaining audio signals between the first reference voltage (V1) and the second reference voltage (V2) to the receiver-integrated speaker 180. Such exceeded parts of audio signals correspond to an acoustic shock that unexpectedly occurs due to some trouble in a communication network, unusual operation in audio gain, etc. Therefore, the present invention can prevent such an unexpected acoustic shock through the prevention circuit 170.

When the audio processing unit 160 supports a differential output type as shown in FIGS. 2A to 2C, the first reference voltage (V1) may correspond to a value made by adding the half of the forward voltage (Vf) of the diode (D1, D2) to the bias voltage (Vb), and the second reference voltage (V2) may correspond to a value made by subtracting the half of the forward voltage (Vf) of the diode (D1, D2) from the bias voltage (Vb). Namely, the first reference voltage (V1) is expressed by Equation 1, and the second reference voltage (V2) is expressed by Equation 2.

$$1^{st} \text{ Reference Voltage (V1)} = Vb + Vf/2 \quad [\text{Equation 1}]$$

$$2^{nd} \text{ Reference Voltage (V2)} = Vb - Vf/2 \quad [\text{Equation 2}]$$

It is therefore desirable to select the diodes D1 and D2 used in the acoustic shock prevention circuit 170 in consideration of the maximum output level of audio signals (e.g., a received voice) output in a receiver mode. For instance, if the maximum output level of audio signals outputted in a receiver mode is set to a range from +0.3V to −0.3V of the bias voltage (Vb), each diode D1, D2 in the acoustic shock prevention circuit 170 according to the first to third embodiments of the present invention has preferably a forward voltage of 0.6V or more. Since the diode having a much higher forward voltage fails to prevent an acoustic shock, such a diode should be avoided. For instance, it is desirable for a diode in the acoustic shock prevention circuit 170 to have a forward voltage of about 0.7V.

On the other hand, when the audio processing unit 160 supports a single output type as shown in FIG. 2D, the first reference voltage (V1) is expressed by Equation 3, and the second reference voltage (V2) is expressed by Equation 4.

$$1^{st} \text{ Reference Voltage (V1)} = Vb + Vf \quad [\text{Equation 3}]$$

$$2^{nd} \text{ Reference Voltage (V2)} = Vb - Vf \quad [\text{Equation 4}]$$

If the maximum output level of audio signals output in a receiver mode is set to a range from +0.3V to −0.3V of the bias voltage (Vb), each diode D1, D2 in the acoustic shock prevention circuit 170 according to the fourth exemplary embodiment of the present invention should have a forward voltage of 0.3V or more. For instance, a desirable diode in the acoustic shock prevention circuit 170 has a forward voltage of about 0.4V.

Hereinbefore, the mobile device 100 having the acoustic shock prevention circuit 170 according to embodiments of the present invention has been described. Now, a prevention method of an acoustic shock will be described in detail.

Figure 4:
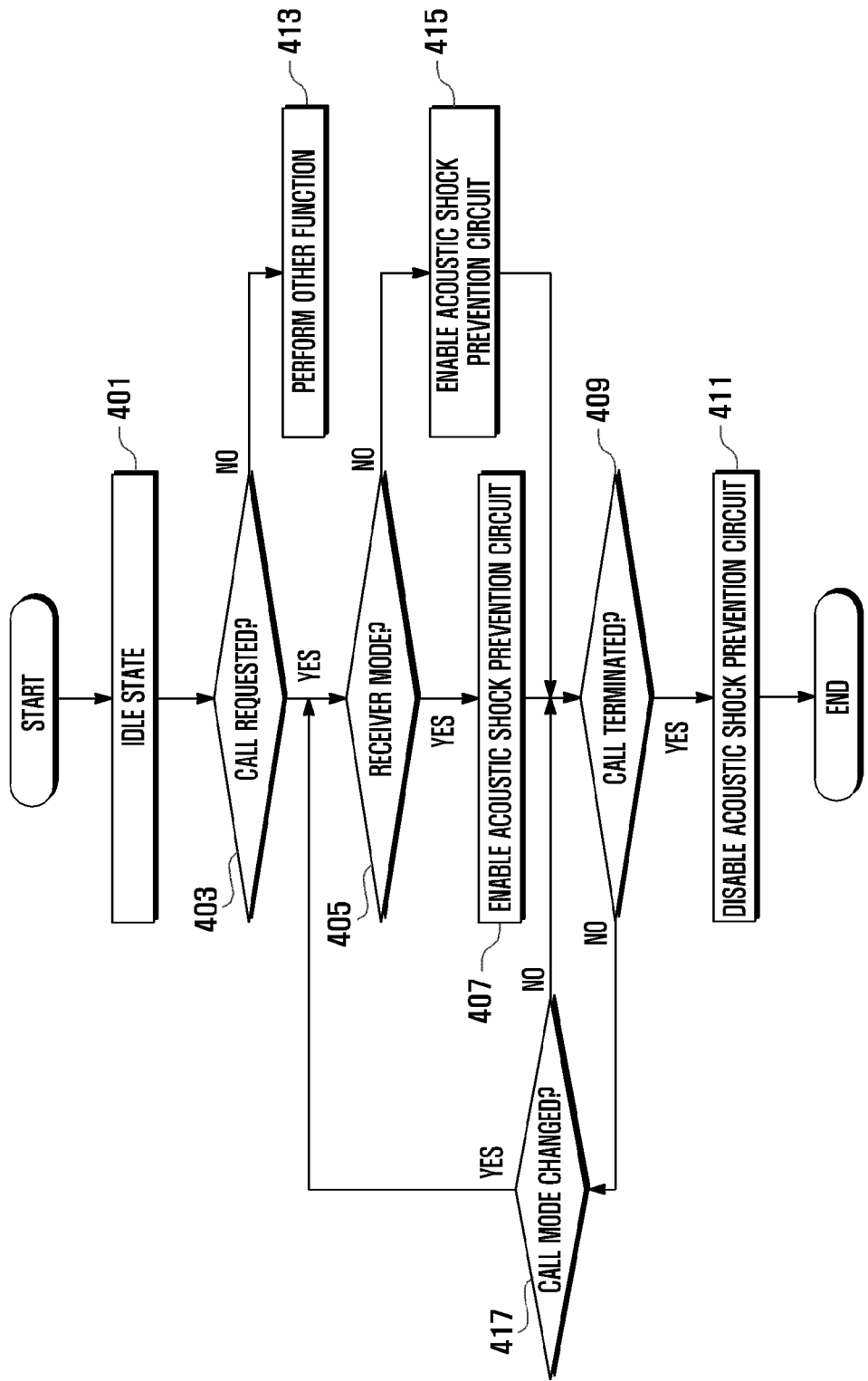
FIG. 4 is a flow diagram illustrating a method for preventing an acoustic shock in accordance with an exemplary embodiment of the present invention.

FIG. 4 is a flow diagram illustrating a method for preventing an acoustic shock in accordance with an exemplary embodiment of the present invention.

The following description will be made on the assumption that the control unit 110 controls the acoustic shock prevention circuit 170 after checking a call mode when there is a call request. The present invention is, however, not limited to that case. Alternatively, the control unit 110 may check an output mode of the audio processing unit 160 in all cases where the audio processing unit 160 is enabled and the output of audio signals is requested, and depending on an output mode, may determine whether to enable the acoustic shock prevention circuit 170.

Referring now to FIGS. 1 to 4, at the outset, the control unit 110 is in an idle state (step 401). Here, the acoustic shock prevention circuit 170 is disabled in a default state.

Next, the control unit 110 checks whether or not there is a call request (step 403). Here, a call request includes both cases of sending a request for an outgoing call and receiving a request for an incoming call. If there is no call request, the control unit 110 performs any other prearranged or requested function (step 413). For instance, the control unit 110 may perform a music play function, a broadcast reception function, etc. at a user's request or still keep in an idle state.

If there is a call request in the aforesaid step 403, the control unit 110 determines whether a current mode is a receiver mode, namely, a normal voice call mode in which a user holds the mobile device 100 to the ear to perform a call (step 405). In case of a receiver mode, the control unit 110 turns the first switch SW1 on in order to enable the acoustic shock prevention circuit 170 (step 407). When the acoustic shock prevention circuit 170 is enabled, the mobile device 100 can prevent an unexpected acoustic shock by restricting the maximum output level of audio signals (e.g., a received voice) through the acoustic shock prevention circuit 170. Namely, the mobile device 100 of the present invention adopts an acoustic shock prevention method based on hardware. Therefore, the present method can also prevent any acoustic shock unexpectedly occurring in a conventional acoustic shock prevention method based on software.

Meanwhile, if it is determined in the aforesaid step 405 that a current mode is not a receiver mode, namely, if a video call, a speakerphone call, a music file play, or the like is performed, the control unit 110 turns the first switch SW1 off in order to disable the acoustic shock prevention circuit 170 (step 415). Namely, the control unit 110 keeps the acoustic shock prevention circuit 170 in a default disabled state like an idle state.

Next, the control unit 110 determines whether a current call is terminated (step 409). Such a call termination may include, for example, a selection of a predefined end call key, a close of a folder or slide, a disconnection of a call, and the like. If a call is terminated, the control unit 110 keeps the acoustic shock prevention circuit 170 in a default disabled state (step 411). Namely, the control unit 100 disables the acoustic shock prevention circuit 170 when detecting a call termination with the acoustic shock prevention circuit 170 enabled, or maintains a disabled state when detecting a call termination with the acoustic shock prevention circuit 170 disabled.

If a call is not terminated in the aforesaid step 409, the control unit 110 further determines whether a call mode is changed (step 417). If a call mode is not changed, the control unit 110 returns to the aforesaid step 409. If a call mode is changed, the control unit 110 returns to the aforesaid step 405. Here, a change of a call mode means a change of an enabled or disabled state of the acoustic shock prevention circuit 170. For instance, if a speakerphone function is activated while a call is performed in a receiver mode with the acoustic shock prevention circuit 170 enabled, the control unit 110 disables the acoustic shock prevention circuit 170. On the contrary, if a speakerphone function is inactivated during a speakerphone call with the acoustic shock prevention circuit 170 disabled, the control unit 110 enters a receiver mode and then enables the acoustic shock prevention circuit 170.

Although the above-discussed method for preventing an acoustic shock adopts the acoustic shock prevention circuit 170 shown in FIG. 2A, the present invention is not limited to that case. The above method may be also applied to the mobile device having the acoustic shock prevention circuit shown in FIGS. 2B and 2C. In case shown in FIGS. 2B and 2C, the second switch SW2 is further used to perform a switching between the receiver output terminals (RCV+, RCV−) selected in the receiver mode and the speaker output terminals (SPK+, SPK−) selected in the speaker mode, and therefore the control unit 110 further includes step of controlling the second switch SW2 according to the output mode of the audio processing unit 160. Meanwhile, in case shown in FIG. 2C, the first switch SW1 is not used since the first and second diodes D1 and D2 are located in front of the second switch SW2, and therefore the aforesaid step of controlling the first switch SW1 is not needed as will be understood by those skilled in the art.

As fully discussed hereinbefore, the mobile device and method according to the present invention restricts the output level of audio signals in the receiver mode through the acoustic shock prevention circuit, namely, by hardware, in order to prevent an acoustic shock unexpectedly occurring due to some trouble in a communication network, unusual operation in audio gain, etc. Particularly, the present invention can prevent any acoustic shock which may occur due to software errors or unusual operation in a conventional acoustic shock prevention method based on software.

Although the above discussion is focused on the restriction of receiver signal outputs, this is exemplary only and not to be considered as a limitation of the present invention. Alternatively, in case of the aforesaid third exemplary embodiment for example, another acoustic shock prevention circuit may be additionally used for a speaker signal path in order to further restrict the maximum output level of speaker signals. Namely, a receiver signal path employs the first acoustic shock prevention circuit to remove audio signals exceeding a given output range in the receiver mode, whereas a speaker signal path employs the second acoustic shock prevention circuit to remove audio signals exceeding a given output range in the speaker mode.

While the present invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A mobile device having a receiver-integrated speaker, the mobile device comprising:
   an audio processor comprising a digital to analog (D/A) converter that converts digital voice signals into analog voice signals, and an analog to digital (A/D) converter that converts analog voice signals to digital voice signals, and a codec configured for decoding audio signals to be output by the receiver-integrated speaker;
   a control unit configured for connecting the receiver output terminals or speaker output terminals to the receiver-integrated speaker by checking an output mode of the audio processor; and
   an acoustic shock prevention circuit for coupling the receiver-integrated speaker and the audio processor, said acoustic shock prevention circuit being enabled when the output mode is a receiver mode, and being disabled when the output mode is a speaker mode, wherein if the audio processor outputs audio signals partly exceeding a given output range, the enabled acoustic shock prevention circuit removes the exceeded parts of the audio signals.

2. The mobile device of claim 1, wherein the audio processor includes:
   receiver output terminals configured for outputting the audio signals in the receiver mode; and
   speaker output terminals configured for outputting the audio signals in the speaker mode.

3. The mobile device of claim 2, wherein the acoustic shock prevention circuit includes:
   a first diode coupled at one end thereof in parallel to a positive speaker terminal of the receiver-integrated speaker;
   a second diode coupled at one end thereof in parallel to the positive speaker terminal of the receiver-integrated speaker; and
   a first switch coupled at one end thereof to both the other end of the first diode and the other end of the second diode, and the first switch further coupled at another end thereof, to a negative speaker terminal of the receiver-integrated speaker, wherein the first switch is turned on or off depending on control of the control unit.

4. The mobile device of claim 3, wherein the given output range is between a first reference voltage corresponding to a value made by adding the half of a forward voltage (Vf) of first and second diodes of the acoustic shock prevention circuit to a bias voltage (Vb) and a second reference voltage corresponding to a value made by subtracting the half of the forward voltage (Vf) of the first and second diodes from the bias voltage (Vb).

5. The mobile device of claim 3, wherein the control unit turns on the first switch on in the receiver mode and turns off the first switch in the speaker mode.

6. The mobile device of claim 3, wherein the acoustic shock prevention circuit further includes a second switch configured for selecting the receiver output terminals or the speaker output terminals of the audio processor for coupling the speaker terminals of the receiver-integrated speaker under the control of the control unit.

7. The mobile device of claim 6, wherein the control unit turns on the first switch and controls the second switch to selectively connect the receiver output terminals and the speaker terminals in the receiver mode, and turns off the first switch and controls the second switch to selectively connect the speaker output terminals and the speaker terminals in the speaker mode.

8. The mobile device of claim 3, wherein the acoustic shock prevention circuit includes:
   a second switch configured for selecting the receiver output terminals or the speaker output terminals of the audio processor for a coupling to the speaker terminals of the receiver-integrated speaker under the control of the control unit;
   a first diode disposed between the audio processor and the second switch and also coupled in parallel to the receiver output terminals; and
   a second diode disposed between the audio processor and the second switch and coupled in parallel to the receiver output terminals.

9. The mobile device of claim 8, wherein the given output range is between a first reference voltage corresponding to a value made by adding the half of a forward voltage (Vf) of first and second diodes of the acoustic shock prevention circuit to a bias voltage (Vb) and a second reference voltage corresponding to a value made by subtracting the half of the forward voltage (Vf) of the first and second diodes from the bias voltage (Vb).

10. The mobile device of claim 2, wherein the acoustic shock prevention circuit includes:
    a first resistor coupled in series to a positive receiver output terminal of the receiver output terminals; and
    a second resistor coupled in series to a negative receiver output terminal of the receiver output terminals.

11. The mobile device of claim 2, wherein the acoustic shock prevention circuit includes:
    first and second diodes each coupled, at a respective first end thereof, in parallel to a positive speaker terminal of the receiver-integrated speaker; and
    a first switch coupled, at one end thereof, to both the other end of the first diode and the other end of the second diode, and further connected, at the other end thereof, to a bias power, wherein the first switch is turned on or off depending on the control of the control unit.

12. The mobile device of claim 1, wherein the control unit is further configured for checking whether a call mode is changed during a call, and to determine whether to enable or disable the acoustic shock prevention circuit according to the call mode.

13. A method for preventing an acoustic shock in a mobile device having a receiver-integrated speaker, the method comprising:
    checking an output mode of an audio processor when there is a request for outputting audio signals;
    connecting a receiver output terminals or speaker output terminals to the receiver-integrated speaker by checking the output mode of the audio processor; and
    controlling by a control unit whether to enable an acoustic shock prevention circuit according to the output mode comprising at least one of receiver mode and a speaker mode by enabling the acoustic shock prevention circuit when the output mode is the receiver mode, and disabling the acoustic shock prevention circuit when the output mode is the speaker mode, wherein the acoustic shock prevention circuit is coupled between the receiver-integrated speaker and the audio processor, and wherein if the audio processor outputs the audio signals partly exceeding a given output range, the enabled acoustic shock prevention circuit removes the exceeded parts of the audio signals.

14. The method of claim 13, wherein the receiver mode is configured for performing a voice call; and
    the speaker mode having at least one of a speakerphone mode, a video call mode, and a music file play mode.

15. The method of claim 13, further comprising:
    checking whether a call mode changes during a call; and
    if the call mode changes, enabling or disabling the acoustic shock prevention circuit according to the changed call mode.

16. The method according to claim 13, wherein the given output range is between a first reference voltage corresponding to a value made by adding the half of a forward voltage (Vf) of first and second diodes (D1, D2) of the acoustic shock prevention circuit to a bias voltage (Vb) and a second reference voltage corresponding to a value made by subtracting the half of the forward voltage (Vf) of the first and second diodes from the bias voltage (Vb).

17. The method according to claim 16, wherein the first diode is coupled at one end thereof in parallel to a positive speaker terminal of the receiver-integrated speaker; and the second diode coupled at one end thereof in parallel to the positive speaker terminal of the receiver-integrated speaker.

* * * * *